United States Patent
Gho et al.

(10) Patent No.: US 8,050,362 B2
(45) Date of Patent: Nov. 1, 2011

(54) SOFT-BIT DE-MAPPING DEVICE AND METHOD OF GENERATING SOFT BITS FOR DECODING

(75) Inventors: Gwang-Hyun Gho, Cupertino, CA (US); Kee-Bong Song, Santa Clara, CA (US); Won-Joon Choi, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 726 days.

(21) Appl. No.: 12/126,859

(22) Filed: May 24, 2008

(65) Prior Publication Data

US 2008/0291819 A1    Nov. 27, 2008

Related U.S. Application Data

(60) Provisional application No. 60/931,688, filed on May 25, 2007.

(51) Int. Cl.
  *H04L 27/06* (2006.01)
(52) U.S. Cl. ........ 375/340; 375/341; 375/316; 375/260; 375/231; 375/262; 375/265
(58) Field of Classification Search .................. 375/340, 375/341, 316, 260, 231, 262, 265
  See application file for complete search history.

(56) References Cited

U.S. PATENT DOCUMENTS

| | | | |
|---|---|---|---|
| 6,473,449 B1 | 10/2002 | Cafarella et al. | |
| 2003/0231714 A1 | 12/2003 | Kjeldsen et al. | |
| 2007/0071140 A1 | 3/2007 | Sontowski | |
| 2007/0086541 A1* | 4/2007 | Moon et al. | 375/267 |
| 2007/0260959 A1* | 11/2007 | Sidi et al. | 714/755 |
| 2007/0297538 A1* | 12/2007 | Kim | 375/340 |

* cited by examiner

*Primary Examiner* — Chieh M Fan
*Assistant Examiner* — Siu Lee
(74) *Attorney, Agent, or Firm* — Thomas H. Ham; Wilson Ham & Holman

(57) ABSTRACT

A soft-bit de-mapping device and method of generating soft bits for decoding quantizes a log-likelihood ratio (LLR) value for a received value using functions bits and channel parameter bits to generate the soft bits. The function bits are generated by quantizing an LLR function for the received value, which includes modifying an original curve of the LLR function to a modified curve such that a segment of the original curve with the lowest slope is protected in the modified curve for a fixed equal quantization step-size. The channel parameter bits are generated by quantizing a channel parameter for the received value to generate channel.

23 Claims, 7 Drawing Sheets

SOFT-BIT DE-MAPPING DEVICE AND METHOD OF GENERATING SOFT BITS FOR DECODING

CROSS REFERENCE TO RELATED APPLICATION

This application is entitled to the benefit of U.S. Provisional Patent Application Ser. No. 60/931,688, filed on May 25, 2007, which is incorporated herein by reference.

BACKGROUND OF THE INVENTION

Orthogonal Frequency Division Multiple Access (OFDMA) technology is getting very popular in modern communication systems since the OFDMA technology can efficiently support multiple mobile stations with limited bandwidth and easily provide Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wide channel is divided into multiple narrow-band subcarriers, which allow orthogonal modulated streams of data to be transmitted in parallel on the subcarriers.

In OFDMA systems, multiple subscribers can simultaneously use different subcarriers for signal transmission. Thus, in an OFDMA system, multiple data bursts can be transmitted from a base station to multiple mobile stations in the same time frame but allocated in different frequency subcarriers. Consequently, an OFDMA system can support multiple mobile stations using different subcarriers.

In OFDMA systems employing certain forward error correction (FEC) schemes, such as convolutional codes and convolutional turbo codes, the decoder performance can be improved by using soft bits (or reliability information) rather than using hard-decided bits. For instance, soft bits are used as inputs for turbo decoding and Viterbi decoding that are based on Maximum A Posteriori (MAP) and Maximum Likelihood (ML) decoding rule, respectively. Given a quadrature amplitude modulation (QAM) constellation, one commonly used metric for de-mapped soft bits is log-likelihood ratio (LLR). Implementing exact LLR is a demanding task, especially for high-QAM modulated signals. Also, when the received bits involve any scaling, e.g., by channel, in addition to added white Gaussian noise (AWGN), these effects must be taken into account when generating the soft-bits. In terms of fixed-point implementation, the required number of bits to represent soft information needs to be minimized, because in general soft bits and some of their derived metrics are stored in memory, while soft decision decoders are decoding entire sequence of bits from the received packet.

Thus, there is a need for a soft-bit de-mapping device and method of generating soft bits for decoding that reduces the required number of soft bits to represent reliability information.

SUMMARY OF THE INVENTION

A soft-bit de-mapping device and method of generating soft bits for decoding quantizes a log-likelihood ratio (LLR) value for a received value using functions bits and channel parameter bits to generate the soft bits. The function bits are generated by quantizing an LLR function for the received value, which includes modifying an original curve of the LLR function to a modified curve such that a segment of the original curve with the lowest slope is protected in the modified curve for a fixed equal quantization step-size. The channel parameter bits are generated by quantizing a channel parameter for the received value to generate channel.

A method of generating log-likelihood ratio (LLR) values for decoding in accordance with an embodiment of the invention comprises (a) quantizing an LLR function for a received value to generate function bits that represent the LLR function, including modifying an original curve of the LLR function to a modified curve such that a segment of the original curve with the lowest slope is protected in the modified curve for a fixed equal quantization step-size, (b) quantizing a channel parameter for the received value to generate channel parameter bits, and (c) quantizing an LLR value for the received value using the function bits with the channel parameter bits to generate soft bits that represent the LLR value.

A method of generating LLR values for decoding in accordance with another embodiment of the invention comprises (a) quantizing an LLR function for a received value to generate function bits that represent the LLR function, including modifying an original curve of the LLR function to a modified curve such that a segment of the original curve with the lowest slope is protected in the modified curve for a fixed equal quantization step-size, (b) quantizing a channel parameter for the received value to generate channel parameter bits, including normalizing the channel parameter using the mean of the channel parameter to produce a normalized channel parameter, and (c) quantizing an LLR value for the received value using the function bits with the channel parameter bits to generate soft bits that represent the LLR value.

A soft-bit de-mapping device in accordance with an embodiment of the invention comprises an LLR function generator, a channel parameter generator and an LLR generator. The LLR function generator is configured to quantize an LLR function for a received value to generate function bits that represent the LLR function. The LLR function generator is further configured to modify an original curve of the LLR function to a modified curve such that a segment of the original curve with the lowest slope is protected in the modified curve for a fixed equal quantization step-size. The channel parameter generator is configured to quantize a channel parameter for the received value to generate channel parameter bits. The LLR generator is configured to quantize an LLR value for the received value using the function bits with the channel parameter bits to produce soft bits that represent the LLR value.

Other aspects and advantages of the present invention will become apparent from the following detailed description, taken in conjunction with the accompanying drawings, illustrated by way of example of the principles of the invention.

DETAILED DESCRIPTION

The following is a mathematical description of log-likelihood ratio (LLR) calculation, which can be used to derive soft bits for quadrature phase-shift keying (QPSK) or quadrature amplitude modulation (QAM) symbols.

Let's model the received QAM symbol in a tone or subcarrier as follows:

$$r = hx + w,$$

where h is complex channel, x is encoded and modulated complex value in the constellation, and w is complex added white Gaussian noise (AWGN) with variance $\sigma^2$ per complex dimension. Then, output of the channel equalizer can be represented as $$y = \frac{r}{h} = x + \tilde{w}, \quad \text{Equation 1}$$

where $\tilde{w}$ is an AWGN with variance $\sigma^2/|h|^2$.

The LLR for the k-th bit in a constellation point is defined as follows:

$$LLR_k = \log\left(\frac{Pr\{b_k = 1 \mid r\}}{Pr\{b_k = 0 \mid r\}}\right), \quad \text{Equation 2}$$

and Equation 2 can be further derived as $$LLR_k = \log\left(\frac{\sum_{\alpha \in S_k^{(1)}} Pr\{x = \alpha \mid r\}}{\sum_{\alpha \in S_k^{(0)}} Pr\{x = \alpha \mid r\}}\right) \quad \text{Equation 3}$$

$$= \log\left(\frac{\sum_{\alpha \in S_k^{(1)}} Pr\{r \mid x = \alpha\}}{\sum_{\alpha \in S_k^{(0)}} Pr\{r \mid x = \alpha\}}\right),$$

where the first equality comes from law of total probability, and the second equality follows using the Bayes rule and the assumption of equal priori probability of x. The quantity $S_k^{(i)}$ indicates a set of QAM symbols with a binary value i in its k-th location.

Using the complex Gaussian conditional probability distribution function (pdf)

$$Pr\{r \mid x = \alpha\} = \frac{1}{\sqrt{2\pi}\,\sigma} \exp\left(-\frac{|r - h\alpha|^2}{2\sigma^2}\right),$$

and log-sum approximation, Equation 3, can be reduced to $$LLR_k \approx \log\left(\frac{\max_{\alpha \in S_k^{(1)}} Pr\{r \mid x = \alpha\}}{\max_{\alpha \in S_k^{(0)}} Pr\{r \mid x = \alpha\}}\right) \quad \text{Equation 4}$$

$$= \frac{|h|^2}{2\sigma^2}\left(\min_{\alpha \in S_k^{(0)}} |y - \alpha|^2 - \min_{\alpha \in S_k^{(1)}} |y - \alpha|^2\right),$$

Figure 1:
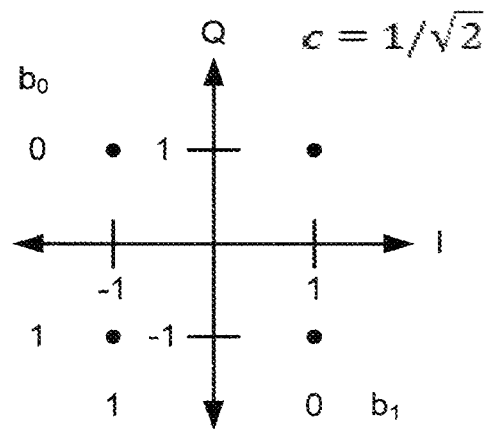
FIG. 1 is a diagram of the constellation for quadrature phase-shift keying (QPSK).
Figure 2:
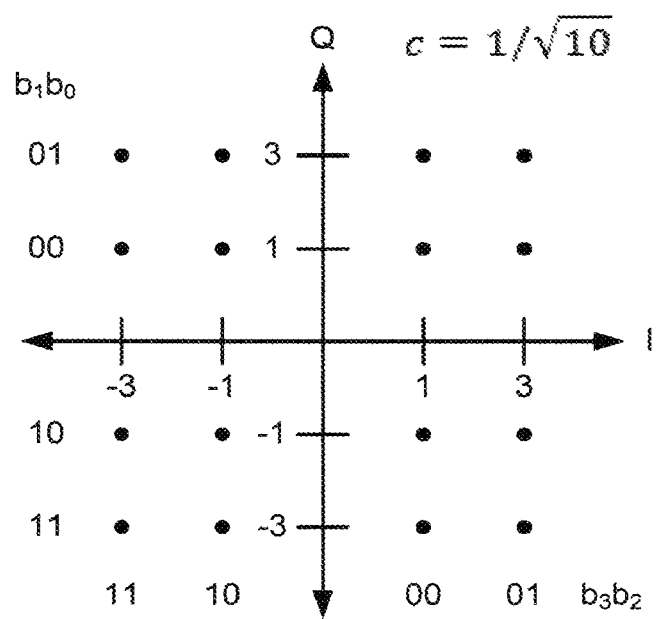
FIG. 2 is a diagram of the constellation for 16-state quadrature amplitude modulation (16-QAM).
Figure 3:
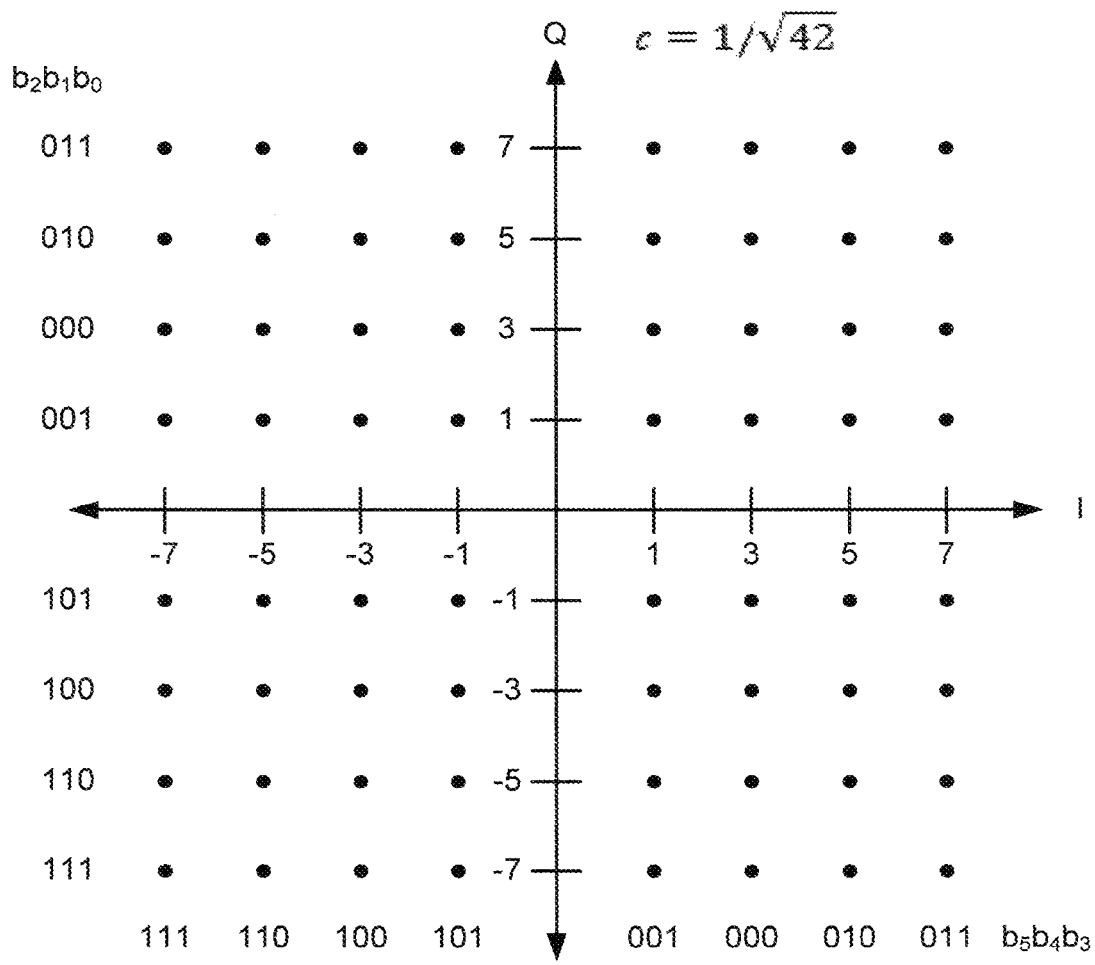
FIG. 3 is a diagram of the constellation for 64-state quadrature amplitude modulation (64-QAM).

After scaling Equation 4 with $2\sigma^2$, for $2^{2M}$-QAM modulated and gray-encoded signals, it can be shown that $$LLR_k = \begin{cases} |h|^2 f_k(y_I) & k = 1, \ldots, M \\ |h|^2 f_{k-M}(y_Q) & k = M+1, \ldots, 2M \end{cases}, \quad \text{Equation 5}$$

where $y_I$ and $y_Q$ are in-phase and quadrature components of the signal respectively, in Equation 1. For gray-encoded constellations, the bit ordering is shown in FIGS. 1-3 for different modulation schemes. The functions $f_k(\bullet)$ in Equation can be calculated as follows:

QPSK $$f_1(x) = -4x$$

16-QAM $$f_1(x) = \begin{cases} -4x & 0 \le x < 2 \\ -8x + 8 & x \ge 2 \\ -f_1(-x) & x < 0 \end{cases} \quad f_2(x) = \begin{cases} 4x - 8 & 0 \le x \\ f_2(-x) & x < 0 \end{cases}$$

64-QAM $$f_1(x) = \begin{cases} -4x & 0 \le x < 2 \\ -8x + 8 & 2 \le x < 4 \\ -12x + 24 & 4 \le x < 6 \\ -16x + 48 & x \ge 6 \\ -f_1(-x) & x < 0 \end{cases}$$

$$f_2(x) = \begin{cases} 8x - 24 & 0 \le x < 2 \\ 4x - 16 & 2 \le x < 6 \\ 8x - 40 & x > 6 \\ f_2(-x) & x < 0 \end{cases}$$

$$f_3(x) = \begin{cases} -4x + 8 & 0 \le x < 4 \\ 4x - 24 & x \ge 4 \\ f_3(-x) & x < 0 \end{cases}$$

Thus, soft bits can be generated using Equation 5. The parameter $|h|^2$ of Equation 5 will sometimes be referred herein to as the channel parameter and the function $f_k(.)$ will sometimes be referred to herein as the LLR function. In order to minimize the number of soft bits to represent the reliability information, i.e., LLR, the number of bits to represent the channel parameter and the number of bits to represent the LLR function need to be reduced.

Figure 4:
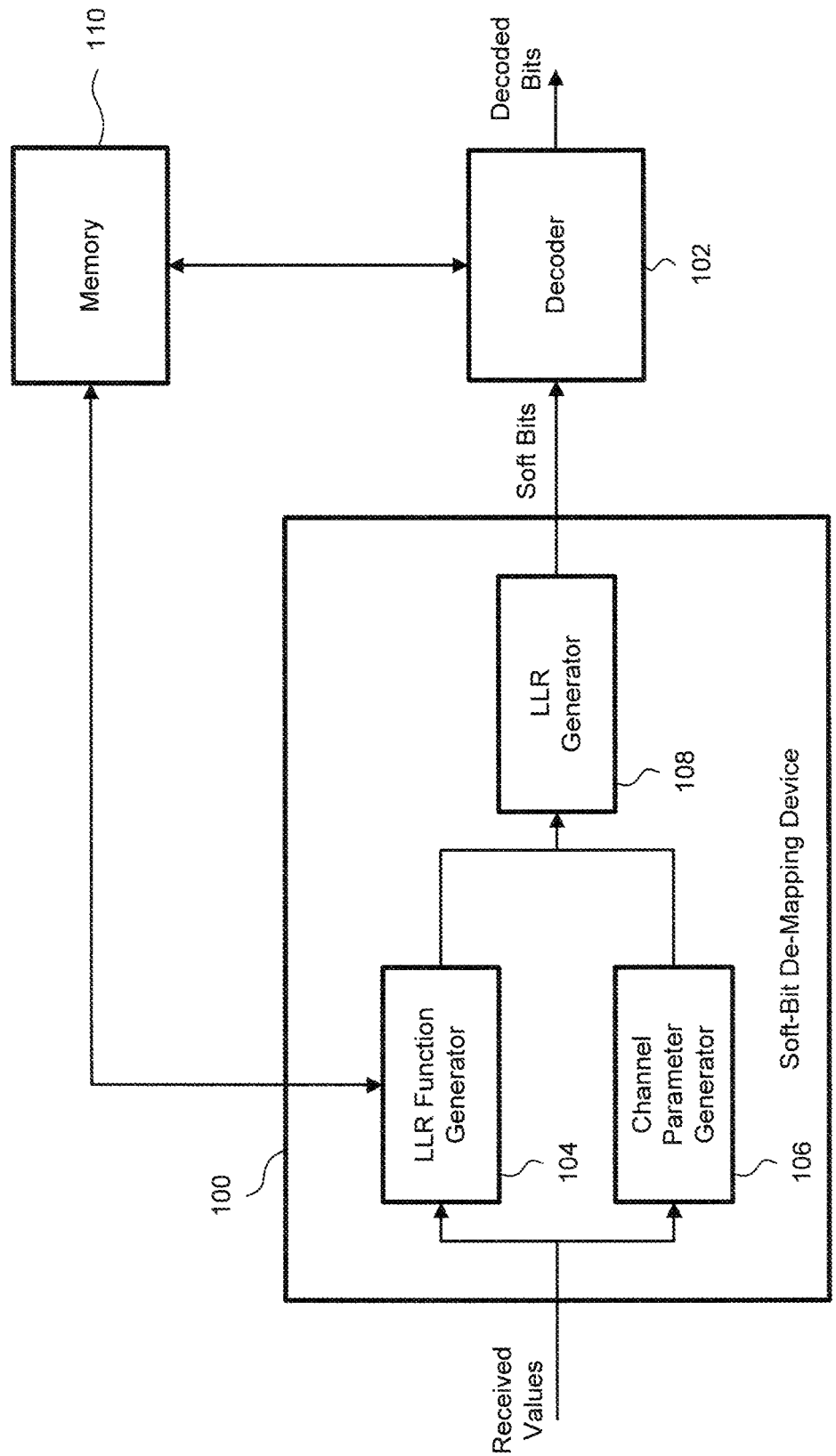
FIG. 4 is a block diagram of a soft-bit de-mapping device in accordance with an embodiment of the invention.

With reference to FIG. 4, a soft-bit de-mapping device 100 in accordance with an embodiment of the invention is shown. The soft-bit de-mapping device 100 operates to generate soft bits that represent log-sum approximated LLRs for received QAM modulated signals or values using Equation 5. The generated soft bits are used as input to a decoder 102, which may be a Viterbi decoder or a Turbo decoder, to produce decoded bits of the received signals. The soft-bit de-mapping device 100 can be implemented in an orthogonal frequency-division multiplexing (OFDM) based receiver, such as an Orthogonal Frequency Division Multiple Access (OFDMA) receiver. However, the soft-bit de-mapping device 100 may be implemented in different receivers, which processes QAM modulated signals.

As shown in FIG. 4, the soft-bit de-mapping device 100 includes an LLR function generator 104, a channel parameter generator 106 and an LLR generator 108. As described below, these components of the soft-bit de-mapping device 100 operate to generate soft bits for LLRs, where the number of bits to represent each LLR is significantly reduced to improve the performance of the decoder 102. The LLR function generator 104, the channel parameter generator 106 and the LLR generator 108 of the soft-bit de-mapping device 100 represent functional blocks that can be implemented in any combination of software, hardware and firmware. In addition, some of these components of the soft-bit de-mapping device 100 may be combined or divided so the soft-bit de-mapping device 100 includes fewer or more components than described and illustrated herein.

The LLR function generator 104 operates to produce bits that represent the LLR functions, $f_k(.)$, of Equation 5. The LLR function generator 104 acquires the different LLR functions using a look-up table, which is stored in memory 110, or using computation logic to generate the LLR functions as needed. The LLR function generator 104 operates to modify the original curves of the LLR functions so that fewer bits can be used to represent the LLR functions while protecting segments of the original curves that are vulnerable to quantization loss. In a fixed-point implementation, given a fixed equal quantization step-size, the segments of LLR functions with lower slope will be more susceptible to quantization loss.

Figure 5:
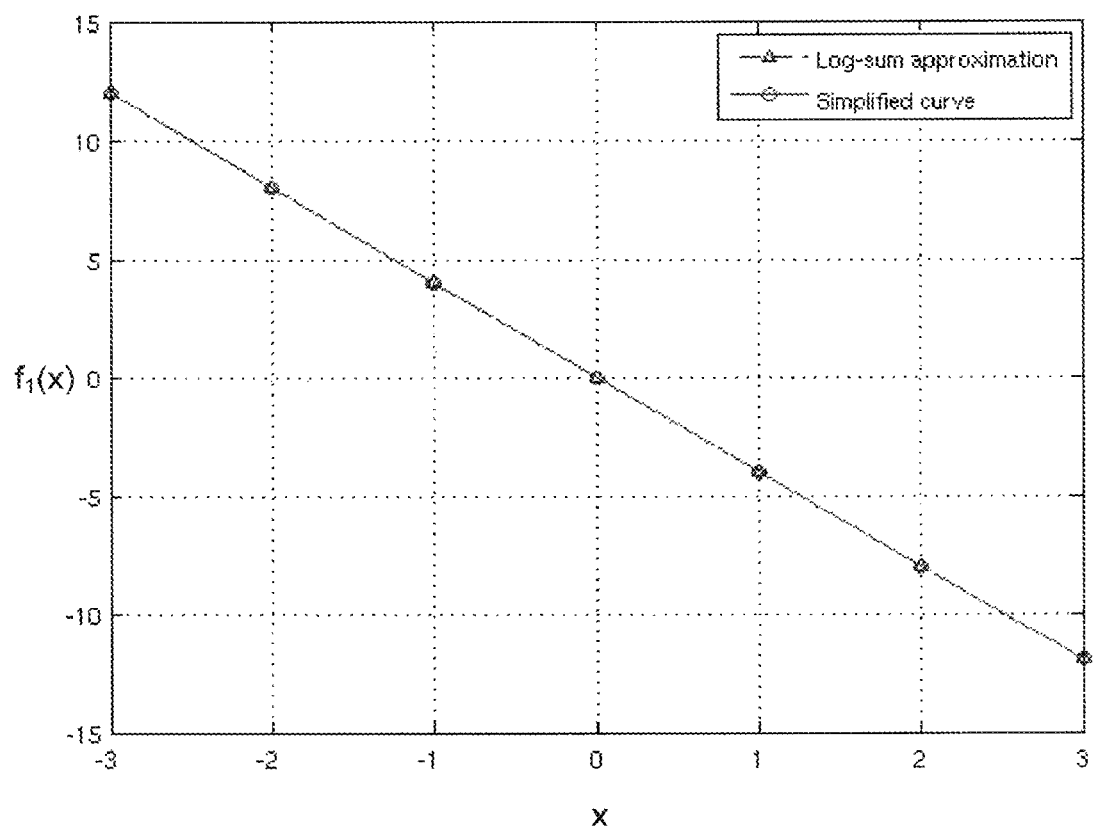
FIG. 5 illustrates original and modified curves for QPSK in accordance with an embodiment of the invention.
Figure 6:
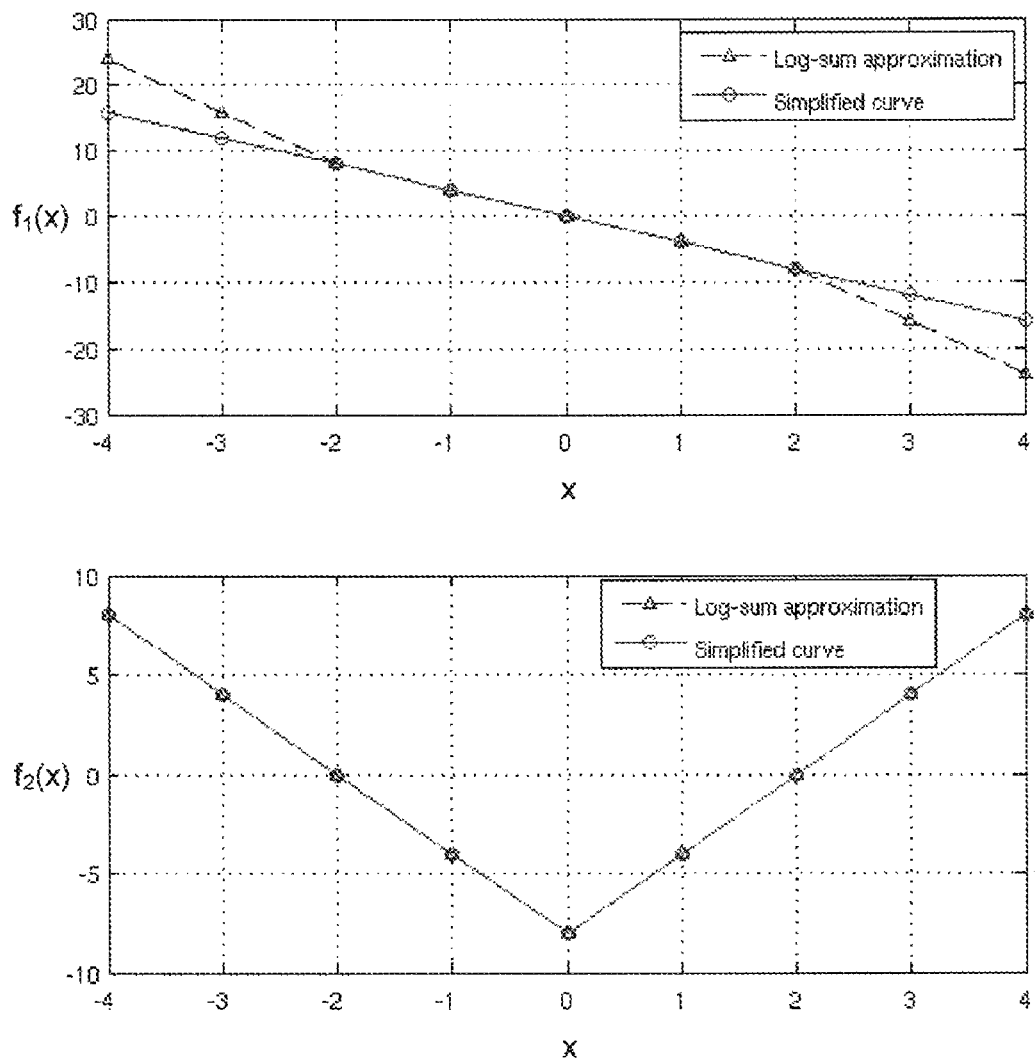
FIG. 6 illustrates original and modified curves for 16-QAM in accordance with an embodiment of the invention.
Figure 7:
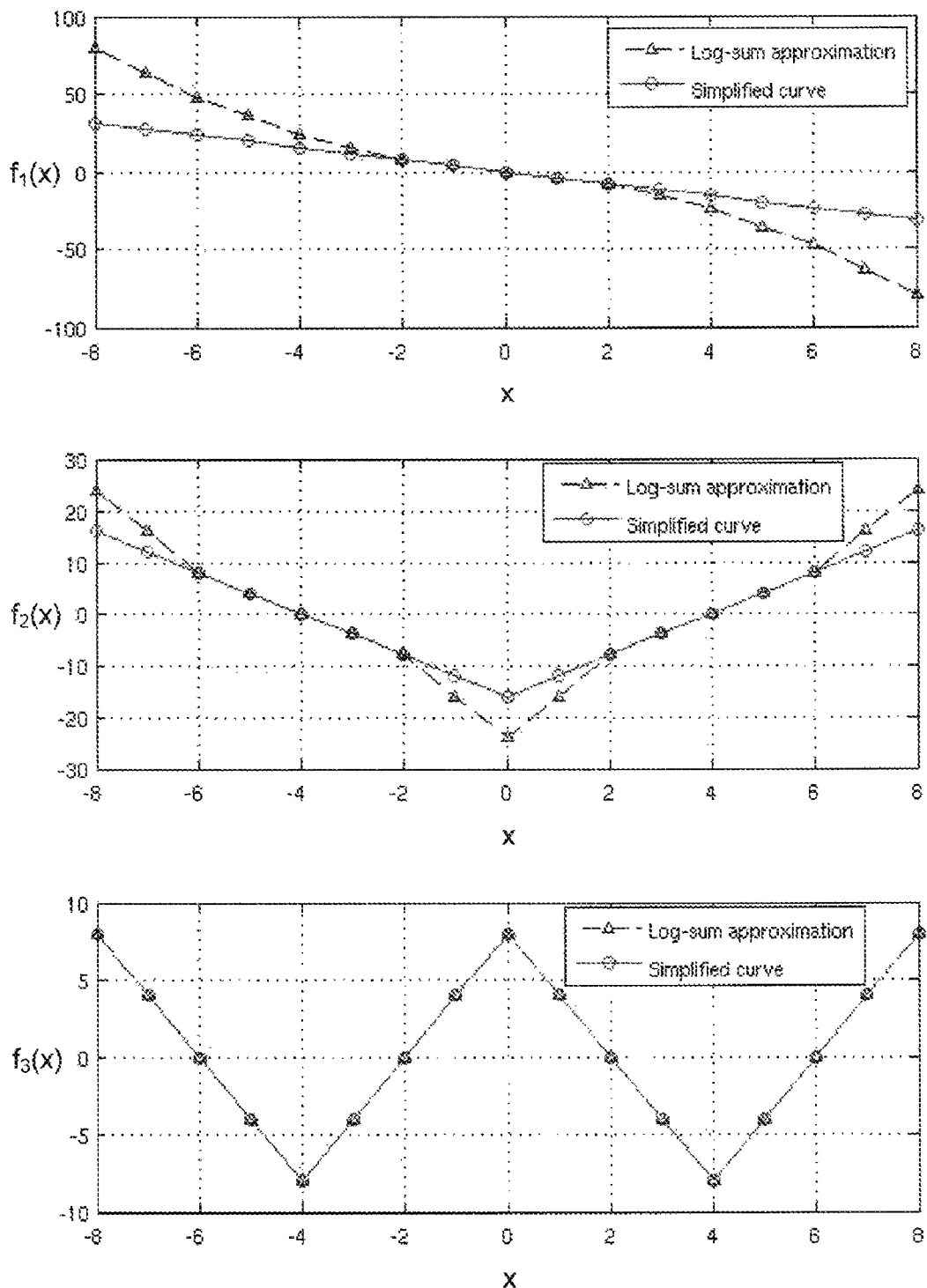
FIG. 7 illustrates original and modified curves for 64-QAM in accordance with an embodiment of the invention.

In order to reduce the quantization loss, the LLR function generator 104 modifies and simplifies the original curves of the LLR functions such that one or more segments with the lowest slope is mostly protected from quantization loss. In an embodiment, an original curve of an LLR function is modified by first locating one or more segments of the original curve with the lowest slope and then extending those segments using the same slope to produce a modified curve of the original curve. This is illustrated in FIGS. 5-7, which show original LLR function curves (dotted lines) and modified LLR function curves (solid lines) for different modulations. In FIG. 5, the original LLR function curve and the modified LLR function for QPSK are shown. For QPSK, the original and modified function curves are virtually identical, and thus, are shown in FIG. 5 as being overlapped. In FIG. 6, the original LLR function curve and the modified LLR function for 16-QAM are shown. The upper graph of FIG. 6 corresponds to the bit in the first location for a 16-QAM symbol, while the lower graph of FIG. 6 corresponds to the bit in the second location for a 16-QAM symbol. In the upper graph of FIG. 6, the segment of the original LLR function between approximately $x=-2$ to $x=2$ is protected from quantization loss. The modified curve in the upper graph of FIG. 6 is formed by extending this segment in both directions, which in this case results in a straight line. In the lower graph of FIG. 6, the original and modified function curves are virtually identical, and thus, are shown as being overlapped. In FIG. 7, the original LLR function curve and the modified LLR function for 64-QAM are shown. The upper, middle and lower graphs of FIG. 7 correspond to the bits in the first, second and third location, respectively, for a 64-QAM symbol. In the upper graph of FIG. 7, the segment of the original LLR function between approximately $x=-2$ to $x=2$ is protected from quantization loss. The modified curve in the upper graph of FIG. 7 is formed by extending this segment in both directions. In the middle graph of FIG. 7, the segment of the original LLR function between approximately $x=-6$ to $x=-2$ and the segment between approximately $x=2$ and $x=6$ are protected from quantization loss. The modified curve in the middle graph of FIG. 7 is formed by extending the segment of the original LLR function between approximately $x=-6$ to $x=-2$ in both directions and extending the segment between approximately $x=2$ and $x=6$ in both direction to form a V-shaped curve centered at $x=0$. In the lower graph of FIG. 7, the original and modified function curves are virtually identical, and thus, are shown as being overlapped. Thus, for certain LLR functions, the original curves are modified and simplified such that the range of the original curves is narrowed along the y axis and one or more segments of the original curves with the lowest slope are maintained.

In an embodiment, the LLR function generator 104 also modifies the range of the x in the curves of the LLR functions, i.e., the range of values along the x axis, independently per modulation type such that certain level of variance is covered given a minimum signal-to-noise ratio (SNR) requirement for each modulation. The last point of x in the positive direction is chosen as follows:

$$x_{end} = x_{max} + \kappa\sigma,$$

where
$x_{max}=1,3$ and 7 for QPSK, 16-QAM and 64-QAM, respectively,
σ is chosen differently for each modulation depending on their minimum SNR requirements, and
κ can be calculated for each modulation using a maximum quantization loss criterion.

For the negative x, the ending point can be chosen symmetrically.

In an embodiment, the LLR function generator 104 further simplifies the modified curves of the LLR functions. The ratio of the maximum absolute values for each k can vary depending on κ and σ, when the end points are selected as described above. However, constant ratios can be assumed regardless of κ and σ values for easier implementation. Thus, given a target of N number of bits to represent an LLR function, a modified curve is first scaled so that the maximum absolute values for each k are set to $2^{N-1}$. Then, the following scaling factors are applied:
1, for k=1 for QPSK,
1 and ½, for k=1 and 2, respectively, for 16-QAM, and
1, ½ and ¼, for k=1, 2 and 3, respectively, for 64-QAM.

As an example, using the above techniques, the LLR function can be represented using six bits. Thus, in this example, the LLR function generator 104 produces six bits for the LLR function.

The channel parameter generator 106 operates to produce bits that represent the channel parameter, $|h|^2$, of Equation 5. The operation of the channel parameter generator 106 is based on the fact that Equation 5 can be simplified by normalizing by mean$\{|h|^2\}$ to reduce its dynamic range. The averaging is taken over the entire or partial symbols that belong to the received packet. Now the modified equation become $$LLR_k = \begin{cases} \overline{|h|^2} f_k(y_I) & k = 1, \ldots, M \\ \overline{|h|^2} f_{k-M}(y_Q) & k = M+1, \ldots, 2M \end{cases}, \text{ where}$$

$$\overline{|h|^2} = |h|^2 / \text{mean}\{|h|^2\}.$$

The pdf of $\overline{|h|^2}$, in fading scenarios, generally has an exponential-like distribution, and a threshold, $\overline{|h|^2}_{th}$, can be found via simulations such that for most of the time the value of $\overline{|h|^2}$ is less than $\overline{|h|^2}_{th}$. Any $\overline{|h|^2}$ greater than $\overline{|h|^2}_{th}$ is saturated to $\overline{|h|^2}_{th}$, and a linear quantization is performed for $\overline{|h|^2} < \overline{|h|^2}_{th}$.

As an example, the channel parameter can be sufficiently represented using four bits. Thus, in this example, the channel parameter generator produces four bits for the channel parameter.

The LLR generator 108 operates to receive the output of the LLR function generator and the output of the channel parameter to produce the final LLR, or soft bits. Given the maximum SNR requirement and using a linear quantizer, the required minimum number of bits for LLR, denoted herein as $B_{min}$, can be calculated. However, depending on the variance of LLR, the quantization step size ($\Delta_{min}$) to achieve $B_{min}$ can be different. If we always use the minimum required step size that is necessary for the least dispersive LLR distribution, a number of bits greater than $B_{min}$ may be needed for the cases with more dispersive LLR distribution. A good indicator of degree of dispersiveness for LLR distribution is SNR. As SNR decreases, LLR becomes more dispersive, and vice a versa. Therefore, the LLR generator is configured to dynamically adjust the step size $\Delta_{min}$ based on measured SNR so that the $B_{min}$ is achieved independent of LLR distribution. The SNR thresholds that determine $\Delta_{min}$ can be decided empirically.

Figure 8:
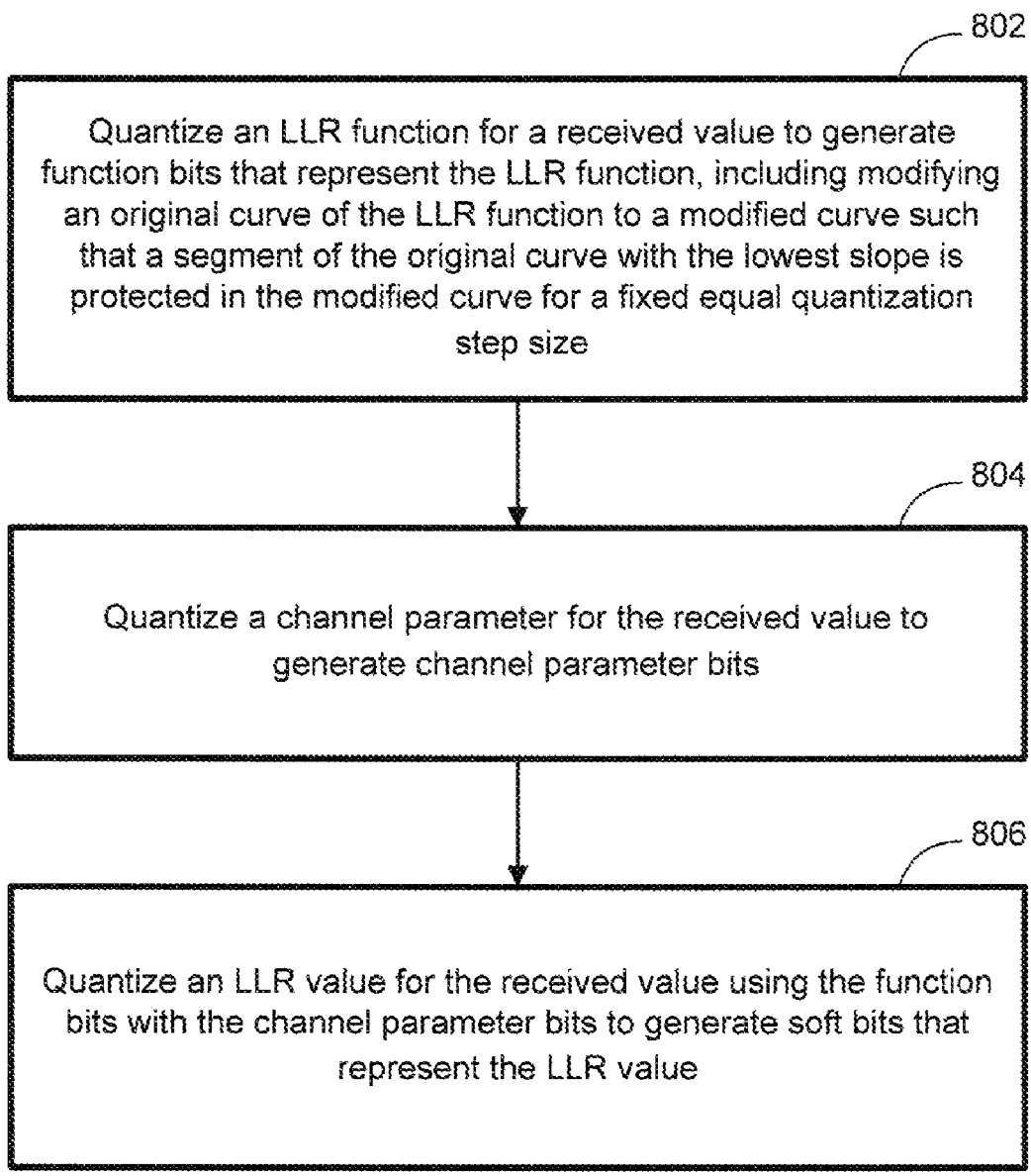
FIG. 8 is a process flow diagram of a method of generating soft bits for decoding in accordance with an embodiment of the invention.

A method of generating soft bits for decoding in accordance with an embodiment of the invention is described with reference to a flow diagram of FIG. 8. At block 802, an LLR function for a received value is quantized to generate function bits that represent the LLR function, including modifying an original curve of the LLR function to a modified curve such that a segment of the original curve with the lowest slope is protected in the modified curve for a fixed equal quantization step-size. At block 804, a channel parameter for the received value is quantized to generate channel parameter bits. At block 806, an LLR value for the received value is quantized using the function bits with the channel parameter bits to generate soft bits that represent the LLR value.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of generating log-likelihood ratio (LLR) values for decoding, said method comprising:
   quantizing an LLR function for a received value to generate function bits that represent the LLR function, including modifying an original curve of the LLR function to a modified curve such that a segment of the original curve with the lowest slope is protected in the modified curve for a fixed equal quantization step size;
   quantizing a channel parameter for the received value to generate channel parameter bits; and
   quantizing an LLR value for the received value using the function bits with the channel parameter bits to generate soft bits that represent the LLR value.

2. The method of claim 1 wherein the quantizing of the channel parameter includes normalizing the channel parameter using a mean of the channel parameter to produce a normalized channel parameter.

3. The method of claim 2 wherein the quantizing of the channel parameter includes limiting the normalized channel parameter using a threshold such that a portion of the normalized channel parameter greater than the threshold is saturated to the threshold.

4. The method of claim 1 wherein the channel parameter is an absolute value of a complex channel squared.

5. The method of claim 1 wherein the quantizing of the LLR function includes limiting the LLR function with respect to a range of received values based on a minimum signal-to-noise ratio requirement for a particular modulation and a maximum quantization loss criterion.

6. The method of claim 5 wherein the limiting of the LLR function includes using an end point defined by:

$$x_{end}=x_{max}+\kappa\sigma,$$

where
   $x_{max}$=1,3 and 7 for QPSK, 16-QAM and 64-QAM, respectively,
   $\sigma$ is dependent on the minimum signal-to-noise ratio requirement for a particular modulation, and
   $\kappa$ is dependent on the maximum quantization loss criterion for the particular modulation.

7. The method of claim 5 wherein the quantizing of the LLR function includes scaling the LLR function by a scaling factor that depends on a modulation type and a particular bit location in its modulated symbol.

8. The method of claim 1 wherein the quantizing of the LLR value includes adjusting a quantization step size based on measured signal-to-noise ratio.

9. The method of claim 8 wherein the adjusting of the quantization step size includes increasing the quantization step size as the measured signal-to-noise ratio is decreased.

10. A soft-bit de-mapping device comprising:
    a log-likelihood ratio (LLR) function generator configured to quantize an LLR function for a received value to generate function bits that represent the LLR function, the LLR function generator being further configured to modify an original curve of the LLR function to a modified curve such that a segment of the original curve with the lowest slope is protected in the modified curve for a fixed equal quantization step size;
    a channel parameter generator configured to quantize a channel parameter for the received value to generate channel parameter bits; and
    an LLR generator configured to quantize an LLR value for the received value using the function bits with the channel parameter bits to produce soft bits that represent the LLR value,
    wherein at least one of the LLR function generator, a channel parameter generator and the LLR generator is implemented in hardware.

11. The device of claim 10 wherein the channel parameter generator is configured to normalize the channel parameter using a mean of the channel parameter to produce a normalized channel parameter.

12. The device of claim 11 wherein the channel parameter generator is configured to limit the normalized channel parameter using a threshold such that a portion of the normalized channel parameter greater than the threshold is saturated to the threshold.

13. The device of claim 10 wherein the channel parameter is an absolute value of a complex channel squared.

14. The device of claim 10 wherein the LLR function generator is configured to limit the LLR function with respect to a range of received values based on a minimum signal-to-noise ratio requirement for a particular modulation and a maximum quantization loss criterion.

15. The device of claim 14 wherein the LLR function generator is configured to limit the LLR function using an end point defined by:

$$x_{end}=x_{max}+\kappa\sigma,$$

where
   $x_{max}$=1,3 and 7 for QPSK, 16-QAM and 64-QAM, respectively,

σ is dependent on the minimum signal-to-noise ratio requirement for a particular modulation, and κ is dependent on the maximum quantization loss criterion for the particular modulation.

16. The device of claim 14 wherein the LLR function generator is configured to scale the LLR function by a scaling factor that depends on a modulation type and a particular bit location in its modulated symbol.

17. The device of claim 10 wherein the LLR generator is configured to adjust a quantization step size based on measured signal-to-noise ratio.

18. The device of claim 17 wherein the LLR generator is configured to increase the quantization step size as the measured signal-to-noise ratio is decreased.

19. A method of generating log-likelihood ratio (LLR) values for decoding, said method comprising:

quantizing an LLR function for a received value to generate function bits that represent the LLR function, including modifying an original curve of the LLR function to a modified curve such that a segment of the original curve with the lowest slope is protected in the modified curve for a fixed equal quantization step size;

quantizing a channel parameter for the received value to generate channel parameter bits, including normalizing the channel parameter using the mean of the channel parameter to produce a normalized channel parameter; and quantizing an LLR value for the received value using the function bits with the channel parameter bits to generate soft bits that represent the LLR value.

20. The method of claim 19 wherein the quantizing of the channel parameter includes limiting the normalized channel parameter using a threshold such that a portion of the normalized channel parameter greater than the threshold is saturated to the threshold.

21. The method of claim 19 wherein the quantizing of the LLR function includes limiting the LLR function with respect to a range of received values based on a minimum signal-to-noise ratio requirement for a particular modulation and a maximum quantization loss criterion.

22. The method of claim 21 wherein the quantizing of the LLR function includes scaling the LLR function by a scaling factor that depends on a modulation type and a particular bit location in its modulated symbol.

23. The method of claim 19 wherein the quantizing of the LLR value includes adjusting a quantization step size based on measured signal-to-noise ratio.

* * * * *